United States Patent [19]

Goldsholl

[11] Patent Number: 4,501,488
[45] Date of Patent: * Feb. 26, 1985

[54] IMAGE PROCESSOR AND METHOD FOR USE IN MAKING PHOTOGRAPHIC PRINTS

[76] Inventor: Morton Goldsholl, Goldsholl Associates, 420 Frontage Rd., Northfield, Ill. 60093

[*] Notice: The portion of the term of this patent subsequent to Dec. 16, 1997 has been disclaimed.

[21] Appl. No.: 331,296

[22] Filed: Dec. 16, 1981

[51] Int. Cl.³ .............................................. G03B 27/44
[52] U.S. Cl. ........................................... 355/46; 355/1
[58] Field of Search ............... 355/46, 33, 1; 354/115; 350/117, 128

[56] References Cited

U.S. PATENT DOCUMENTS

| | | | |
|---|---|---|---|
| 1,887,872 | 11/1932 | Ernst | 350/322 |
| 2,063,985 | 12/1936 | Coffey | 354/115 |
| 3,099,195 | 7/1963 | Goodbar | 350/128 |
| 3,734,618 | 5/1973 | Dudley | 354/115 |
| 4,045,133 | 8/1977 | Carlson | 355/1 |
| 4,239,380 | 12/1980 | Goldsholl | 355/52 |

FOREIGN PATENT DOCUMENTS 285738  2/1928  United Kingdom ............... 350/117

*Primary Examiner*—Monroe H. Hayes
*Attorney, Agent, or Firm*—Neuman, Williams, Anderson & Olson

[57] ABSTRACT

An image processor and method are disclosed for use in making photographic prints, in which a relatively thin plate-like unit is placed over unexposed photographic sheet material while an enlarger or the equivalent is used to develop a primary image at the top face of the unit. The unit includes an array of optical elements in the form of lenses having a certain focal length which produces an averaging effect to cause development of a resultant image which is divided into contiguous modular portions.

10 Claims, 8 Drawing Figures

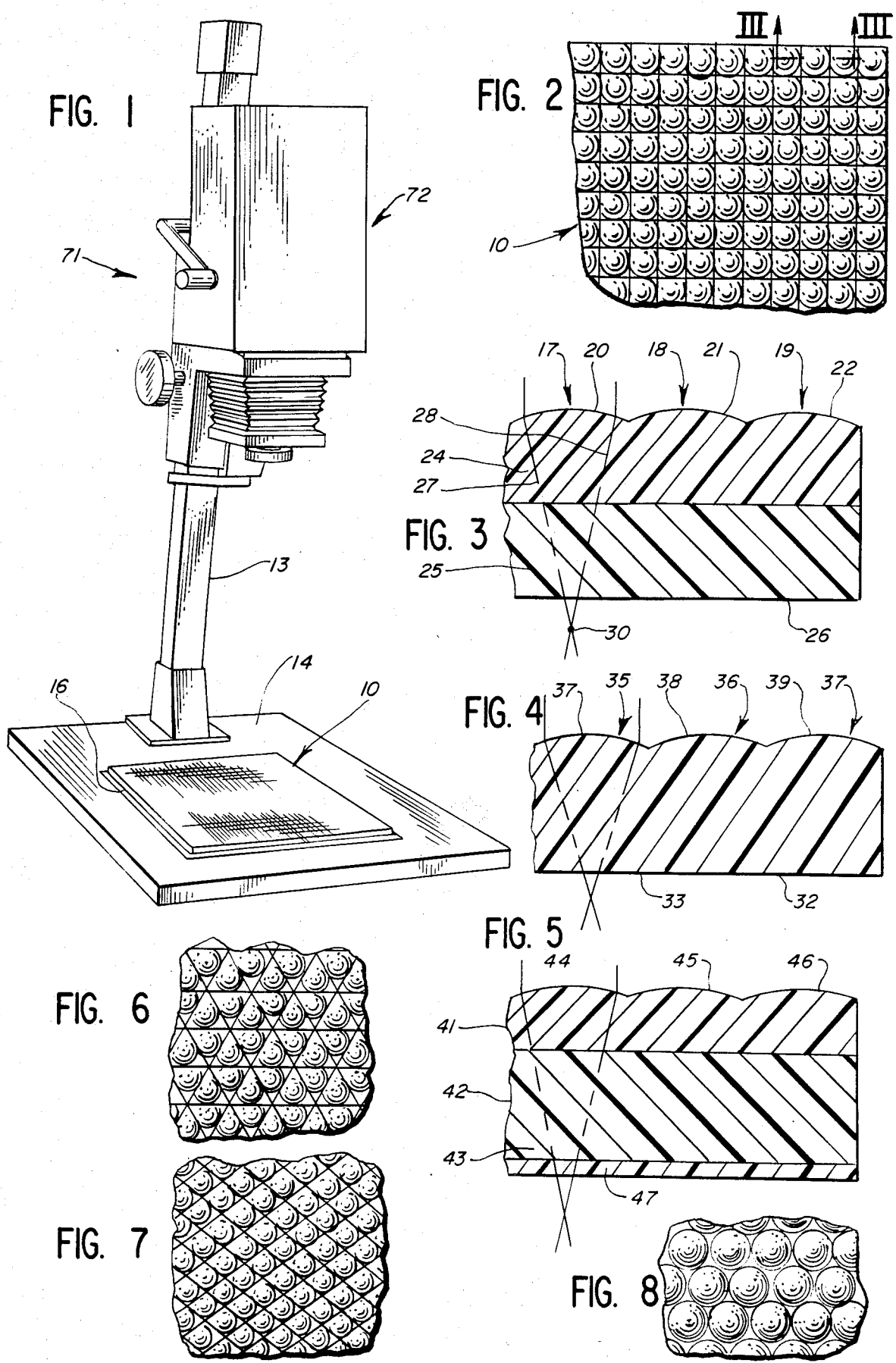

IMAGE PROCESSOR AND METHOD FOR USE IN MAKING PHOTOGRAPHIC PRINTS

This invention relates to the processing of images for creating artistic renditions thereof and more particularly to a processor and method for use in making photographic prints by which a primary image such as one recorded on film may be used to produce an image on unexposed photographic sheet material which image is divided into contiguous modular portions. The processor of the invention is relatively simple in construction and operation and is readily usable by amateur and professional photographers to produce a wide variety of interesting visual effects.

BACKGROUND OF THE INVENTION

In my U.S. Pat. No. 4,239,380, I disclose image processing apparatus and methods in which a primary image is processed by an array of optical elements, using an arrangement in which a primary image is produced at a primary image plan, as for example at a plate of opal glass or plastic material, or of ground glass or otherwise providing light diffusing means in one plan. The primary image so developed is processed by an array of optical elements which may be in the form of square lenses in a row-column format, each lens element being operative to develop a modular image portion which is substantially separate from portions produced by adjacent optical elements. The camera is disclosed in spaced relation to the processor structure to record the resultant image.

As I disclosed in my aforesaid patent, the image might conceivably have been recorded by providing a film, photosensitive paper or other recording means adjacent to the array of optical elements but the use of the camera means was preferred because of certain advantages, particularly with respect to the flexibility of being able to adjust the effective size of the recorded portion of a resultant image in relation to the size of the modular portions.

The production of images having modular portions has been accomplished by computer techniques and scanning techniques but has not been conveniently available for general use by photographers. The use of any computer technique is quite difficult to accomplish without using highly specialized equipment and the optical arrangements as heretofore provided have also been complicated and have not produced the desired effects.

SUMMARY OF THE INVENTION

This invention carries forward the concepts as disclosed in my aforesaid U.S. Pat. No. 4,239,380 and was evolved with the general object of applying such concepts to a processor and method which might be used by amateur and professional photographers operating in a darkroom.

In accordance with this invention, a processor is provided for use in making photographic prints, including a unit having opposite generally parallel surfaces and arranged to be placed on an unexposed photographic sheet material, such as enlargement paper, to engage one surface of the unit with the paper. The unit includes an array of optical elements arranged to produce from a primary image developed at the opposite surface, a resultant image divided into contiguous angular portions. This arrangement is thus similar to that of my aforesaid U.S. patent but differs therefrom in that no camera is required, the modular image portions being directly produced on the unexposed photographic sheet material which may then be developed by conventional techniques. Thus, any image on film may be used in producing a resultant quantitized print having modular portions. The system may be used with all types of images, one important use being to produce protraits of modular form.

The optical elements of the unit are preferably in the form of individual lens portions, each having the same focal length and an important feature of the arrangement is that the spacing between the refracting surface of each lens portion and the surface of the unit may be exactly set in relation to the focal length of the lens portion. This is very important because the spatial distance is somewhat critical with respect to obtaining the optimum effect, especially with regard to producing a modular portion in the resultant image which is of generally uniform hue and intensity, corresponding to the average hue and intensity of the image as impinged upon the lens portion.

It is also important to have the proper spacing in order to obtain a reasonably sharp line of demarcation at the boundary between contiguous portions in the resultant image. In general, the optimum effect is attained when the distance is of the same order of magnitude as the focal length of the lens portion but somewhat different from the focal length so as to provide a defocusing or blurring effect.

In one type of processor constructed in accordance with the invention, the lens portions are formed on one face of a plate of plastic material, the opposite face of which is planar, each portion being formed by a spherical convex surface having a certain radius of curvature. The plates so provided are secured to one surface of a second plate, the opposite surface of which may be used to contact the photosensitive material. This arrangement has the advantage that the plate which has the optical elements formed therein may be relatively thin and the second plate may have a thickness as required to obtain the optimum spacing.

Also, it is possible to use a plurality of plates to form the optical elements and such plates may be cemented or otherwise secured to the second plate while being disposed with edges contiguous thereto in order to provide an array of a large number of optical elements.

The processors of the invention are thus readily and economically manufacturable and they can be easily used by amateur and professional photographers to obtain the desired effects. To increase the types of effects which may be obtained and to increase the range of sizes of primary images with which the system may be used, a plurality of processors may preferably be provided, using different sizes and patterns of optical elements.

This invention contemplates other objects, features and advantages which will become more fully apparent from the following description taken in conjunction with the accompanying drawings.

BRIEF DESCRIPTION OF THE DRAWINGS

FIG. 1 is a perspective view illustrating a processor according to the invention, in use in conjunction with an enlarger;

FIG. 2 is a top plan view of a portion of the processor shown in FIG. 1;

FIG. 3 is a sectional view taken substantially along line III—III of FIG. 2 and on an enlarged scale illustrating the construction of the processor;

FIG. 4 is a sectional view similar to FIG. 3 but illustrating a modified construction;

FIG. 5 is another sectional view similar to FIG. 3 but illustrating another modified construction;

FIG. 6 is a top plan view of another modified processor, illustrating how modular portions may have a triangular rather than a square shape;

FIG. 7 is a plan view similar to FIG. 6 and illustrating how modular portions may have a diamond rather than a square or triangular shape; and FIG. 8 is a view similar to FIGS. 6 and 7, illustrating how modular portions may have a circular rather than a square, triangular or diamond shape.

DESCRIPTION OF THE PREFERRED EMBODIMENTS

Reference numeral 10 generally designates an image processor constructed in accordance with the principles of the invention and shown in use in conjunction with an enlarger 11 of conventional construction including a projection unit 12 adjustably mounted on a standard 13 which has a lower end secured to a table 14. The processor 10 is used to convert an image from a negative into a resultant image which is divided into contiguous square modular portions in a regular row-column format, each modular portion being formed by a portion of the projected primary image which is aligned with a spherical element of the array. Before using the processor 10, the photographer may project an image from a film onto the table 14 and adjust the position of the projection head 12 as well as the focus of the lens of the enlarger to obtain an image on the table which is of the desired size and substantially in focus.

After doing so, he may then place an unexposed enlarging sheet 16 on the table 14 and then place the processor 10 thereon. Then, the projector unit 12 of the enlarger 11 is energized for a certain time interval, dependent in part upon the type of enlarging sheet used and the intensity of light. Then, the enlarging sheet 16 is developed to produce a print which will have square modular portions in a row-column format, each of which will be of generally uniform hue and intensity, corresponding to a portion of the projected image. The processor 10 is arranged to produce a relatively sharp line of demarcation at the boundary between contiguous portions in the resultant image.

The projected image may be a black and white image or it may be in color and the processor 10 is readily usable in connection with color printing operations.

FIG. 2 is a top plan view of a portion of the processor illustrating an array of optical elements of square shape in a regular row-column format and FIG. 3 is a cross-sectional view on an enlarged scale, illustrating three of the optical elements which are designated by reference numerals 17, 18 and 19. Optical elements 17, 18 and 19 are formed by forming convex substantially spherical surface portions 20, 21 and 22 in one face of a member 24 of a transparent material, which may preferably be a plastic material. The member 24 is supported on a plate 25 which may also preferably be of a transparent plastic material and which has a surface 26 forming a contact surface for contact with unexposed photographic sheet material.

The thickness of the members 24 and 25 is important because the distance from the contact surface 26 to the lens surfaces 20, 21 and 22 should desirably be relatively close to the effective focal length obtained by the lens surfaces 20, 21 and 22, but different therefrom to a certain degree. In such circumstances, an averaging effect occurs due to a slight spreading effect at an out of focus point. When there is a substantial difference between the intensity and/or hue of portions of the primary image aligned with adjacent ends of portions, there is a sharp line of demarcation at the boundary between contiguous portions in the resultant image. Images in which there is a continuous and gradual change are converted into a resultant image having sharply defined changes. Portraits are generally a very good subject for processing by the processor 10 of the invention but almost any type of primary image can be processed.

As indicated by broken lines 27 and 28 in FIG. 3, the lens surface 20 of the element 17 may be such as to produce a focal point 30 which is slightly below the surface 26. It will be understood, however, that the focal point could be above the surface or, in some cases, quite close to the surface 26 dependent upon the effect desired.

FIG. 4 illustrates a modified arrangement in which a single member 32 is provided to form both the optical elements and a surface 33 for contact with the photographic sheet material. The member 32 forms elements 34, 35 and 36 by having convex surface portions 37, 38 and 39 on the side of the member 34 opposite the surface 33. The radius of curvature of the surfaces 37, 38 and 39 may be greater than the radius of curvature of the surfaces 20, 21 and 22 in the embodiment shown in FIG. 3, to reduce the required thickness of the member 32.

The arrangement of FIG. 3 has the advantage that the member 24, which may be molded from plastic to form the optical elements, may be relatively thin. Also, in fabrication, a plurality of plates such as the plate 24 may be molded or otherwise fabricated and may then be secured to the plate 25 with their adjacent edges in abutting relationship.

FIG. 5 illustrates another modification in which three plates 41, 42 and 43 are used, lens surfaces 44, 45 and 46 being provided on one surface of the member 41 with the member 42 being sandwiched between the members 41 and 43 and with the member 43 having a contact surface 47 for contact with the photographic sheet material. The member 47 as well as other members in the illustrated embodiments may be of a translucent material or of a transparent material.

By way of example, and not by way of limitation, a processor unit may be provided having 1600 elements formed in a 40 row-40 column format, each being a ¼ inch square, the processor having outside dimensions of 10 inches by 10 inches. If a larger size is desired, a plurality of such processors may be disposed with edges in abutting relationship.

The modular portions may be of smaller or larger sizes and preferably, a plurality of processors may be provided having modular elements of various sizes so that the photographer can obtain a variety of effects and process images of various sizes. Also, a variety of shapes may be used such as a triangular shape shown in FIG. 6, the diamond shape shown in FIG. 7 and the circular shape shown in FIG. 8. It is also possible to invert the processor units engaging the lens sides with the photo-sensitive paper, to obtain special effects.

It will be understood that other modifications and variations may be effected without departing from the spirit and scope of the novel concepts of this invention.

I claim:

1. An image processor for use by photographers to produce special visual effects, said processor being adapted to be disposed in a stationary position against unexposed photographic enlarging paper while operating an enlarger, said processor comprising: a unit having a contact surface for direct engagement with the unexposed photographic enlarging paper while a primary image to be processed is projected by the enlarger to an opposite surface of said unit in closely spaced parallel relation to said contact surface thereof, said unit including an array of optical elements in side-by-side relation to each other and arranged to develop from portions of the primary image at said opposite surface a resultant image at said contact surface divided into contiguous modular portions with sharp lines of demarcation at the boundaries between contiguous modular portions, each modular portion being produced by one of said optical elements from a portion of the primary image which is aligned therewith and which is substantially separate from the portions aligned with adjacent optical elements, each of said optical elements being in the form of a lens element and said lens elements all having substantially the same focal length and being spaced a distance from said contact surface of on the order of said focal length but differing from said focal length to an extent such that each of said lens elements is effective to produce from an aligned portion of said primary image which is of non-uniform hue and intensity a modular portion of said resultant image which is of generally uniform hue and intensity, the transverse dimension of each of said optical elements being of a size large enough to permit said modular portions of said resultant image and said sharp lines of demarcation therebetween to be readily discerned when viewing the developed enlarging paper.

2. In an image processor as defined in claim 1, each of said optical elements having transverse width dimensions of on the order of ¼ inch.

3. In an image processor as defined in claim 1, said optical elements being of polygonal shape with each side of each element being contiguous to a side of an adjacent element.

4. In an image processor as defined in claim 3, said unit including a plurality of members of transparent material, each being formed to provide a plurality of said optical elements, said members being disposed in contiguous relation to place sides of elements of each member in contiguous relation to sides of elements of an adjacent member.

5. In an image processor as defined in claim 4, said unit further including a plate member having a planar surface defining said contact surface and arranged to support all of said members which define said optical elements.

6. In an image processor as defined in claim 1, a member of transparent material formed to define said array of optical elements and having a planar surface defining said contact surface.

7. In an image processor as defined in claim 1, a member of transparent material formed to define said array of optical elements and a contact member secured to said member of transparent material and having a planar surface defining said contact surface.

8. In an image processor as defined in claim 7, at least one plate member light-transmitting material disposed between said member of transparent material and said contact member.

9. In an image processor as defined in claim 1, translucent material for diffusion of light within said unit.

10. A method of projecting a photographic image to unexposed photographic enlarging paper to produce special visual effects, comprising the steps of: providing a unit having a contact surface and an opposite surface in spaced parallel relation and including an array of lens elements in side-by-side relation to each other and having transverse dimensions of on the order of one-fourth inch, all having substantially the same focal length and being spaced a distance from the contact surface of on the order of said focal length but differing from said focal length to an extent such that each of the lens elements is effective to produce from an aligned portion of a primary image at said opposite surface which is of non-uniform hue and intensity a modular portion of a resultant image at said contact surface which is of generally uniform hue and intensity and with the resultant image being divided into contiguous modular portions with sharp lines of demarcation at the boundaries between such contiguous modular portions, disposing said unit against the unexposed photographic enlarging paper, projecting an image to said opposite surface of the unit to expose the photographic paper to the resultant image for a certain exposure time interval, and developing the exposed enlarging paper.

* * * * *